Patented Apr. 22, 1930

1,755,892

UNITED STATES PATENT OFFICE

WILLIAM BEACH PRATT, OF WELLESLEY, MASSACHUSETTS, ASSIGNOR, BY MESNE ASSIGNMENTS, TO DISPERSIONS PROCESS, INC., OF DOVER, DELAWARE, A CORPORATION OF DELAWARE

PRODUCTION OF AQUEOUS RUBBER DISPERSIONS

No Drawing. Application filed July 10, 1924, Serial No. 725,208. Renewed September 14, 1927.

In my application Serial No. 662,556, filed September 13, 1923, I have described a process of separating the globules of rubber of a crude or reclaimed character, and dispersing them in an aqueous medium, and I have therein described as one of the dispersing agents saponin or soap bark extract, and have stated that the rubber or rubber compound may be conditioned for dispersion by milling therein a small quantity of a water-carrying colloid such as glue.

On continuing my work in the dispersion of rubber and rubber compounds, I have found that, if a sufficient quantity of the colloidal material is added and worked into the mass of rubber together with water, a dispersion may thereby be obtained without the employment of an additional dispersing agent; but that, if the colloid employed be animal glue or the like, an excessive quantity, say 50% by weight of the weight of rubber, is necessary before a satisfactory dispersion is secured.

The function of the colloid, as stated in my said application, is to carry into the rubber mass a certain quantity of water and at the same time to form a protective film or coating for the rubber globules, as a result of which the interfacial tension of the globules is reduced so that with the introduction of more water the surface tension of the globules increases and their separation from each other may be attained. I have found that, in lieu of glue, for example, I may use any other suitable water-carrying colloid such as sea moss, or Irish moss so-called, which functions in substantially the same manner as glue when the latter is worked into the rubber mass together with water. An Irish moss jelly, if used in sufficient quantities together with water, will permit the separation and dispersion of the rubber globules; but, whenever there is worked into the rubber mass an amount of the water-carrying colloid sufficient only to provide a protective film or coating for the rubber globules, it is desirable to employ as an additional dispersing agent some substance which will not affect the colloid so as to cause it to coagulate but which will have the effect of reducing the interfacial tension and increasing the surface tension of the coated globules. A solution of saponin or soap bark extract operates as a dispersing agent as pointed out in my application hereinbefore recited. I have discovered, however, that there are various organic bodies, especially those of nitrogenous character, which may be employed for this purpose. For example that compound which is produced by causing the reaction with glue or albumin under proper conditions of heat of just sufficient caustic alkali to effect a stable compound without the presence of free alkali may be employed as the dispersing agent. Thus I may utilize such materials as blood albumin or bean albumin to produce an albuminate in which there is no free alkali, or a gelatinate such as is produced by caustic soda from hide or bone glue, without the presence of free alkali in the mass. By employing both a water-carrying colloid for carrying water into the rubber mass and affording a protective coating for the globules constituting the mass and a dispersing agent which is neutral in respect of the colloid so as not to cause the coagulation thereof, it is possible to employ relatively small quantities of these two components.

The rubber or rubber compound, e. g. crude rubber together with sulphur, pigments, accelerators and the like, is initially conditioned with the usual compounding rolls until the mass is relatively soft. During this conditioning operation there is added to and worked into the mass about 5% of a suitable water-carrying colloid such as hide glue, sea moss jelly or the like. At the same time there may be added a small amount of water, say about 5% to 10% by weight of the weight of the initial rubber mass.

I prepare a dispersing agent by adding to nitrogenous material such as the glue or albumin just sufficient caustic alkali to combine therewith to produce a stable chemical compound without the presence of free alkali in the mass, this being accomplished by mixing the alkali with the glue and heating the mass to a temperature of about 100° C. The product is neutral and water soluble.

The compounded rubber mass is now transferred to a mixing machine of the nature of a dough mixer in which the blades do not come in contact with each other or with the walls of the mixer. The blades are caused to rotate slowly and at the same time a solution of the dispersing agent, consisting of a 5% solution of the gelatinate or albuminate hereinbefore referred to, is added gradually to the mass, being fed in slowly and constantly. The operation of the blades is such as to stretch successive portions of the mass, the water being taken up by the mass until a point is reached in which it appears that the mass is ready to fall apart into its constituent globules. Upon the continued addition of the solution, a change of phase is apparent and the rubber mass disperses in the form of globules throughout a continuous phase or medium of water.

This process is essentially different from that practiced in connection with a colloidal mill since there is no grinding or breaking down of the rubber globules. The action of the blades is relatively slow, their operation being somewhat analogous to that of the bars in a taffy-pulling machine in which the mass is stretched and pulled. The effect of the operation is first to cause each globule of the crude rubber or crude rubber compound to be coated with a colloid, and then for the interfacial tension of the globules to be so reduced and the relative surface tension of the rubber globules and water to be so changed that the coated globules disperse in the water.

The product is a smooth paste which may be diluted with water, and in which the rubber globules may be coagulated by an acid to form a crude rubber mass.

I do not herein claim the subject matter of my application Serial No. 662,556, filed September 13, 1923, which, as previously stated, discloses the incorporation of a hydrophilic colloid such as glue into a rubber mass, and the manipulation of the mass and the colloid in the presence of water preferably containing an additional dispersing agent of a lubricating character which will not affect the colloid. This application is, as previously stated, concerned with, and has claims directed to, the discovery that certain organic water-carrying colloids, such as sea moss jelly, may be employed as the hydrophilic or water-carrying colloid, and that certain organic dispersing agents, such as glue or blood or bean albumin, may be united with an alkali such as caustic soda to produce stable, alkali-free compounds which may be successfully employed as additional dispersing and lubricating agents without injuriously affecting the colloid. Nor do I herein claim the dispersed product, products of this general character being claimed in certain other patent applications filed by me.

What I claim is:—

1. A process of dispersing rubber or rubber compounds, which comprises incorporating an organic water-carrying colloid into the mass, and then adding an aqueous solution, free from free alkali, of a stable chemical compound produced by combining a non-metallic colloid and a caustic alkali.

2. A process of dispersing rubber or rubber compounds, which comprises incorporating in the mass thereof sea moss jelly, and then manipulating thereinto an aqueous solution of the reaction product of an organic dispersing agent and an alkali which does not maleficially affect the sea moss jelly until the rubber of the mass separates into its constituent globules.

3. A process of dispersing rubber, which comprises incorporating into the rubber, when in the continuous phase, an organic hydrophilic colloid and the reaction product of an organic dispersing agent and an alkali, which does not injuriously affect the colloid, and manipulating the mass in the presence of water until the rubber disperses in the water, the water then being in the continuous phase.

4. A process of dispersing rubber, which comprises incorporating into the rubber, when in the continuous phase, sea moss jelly, and gradually manipulating thereinto an aqueous solution of the reaction product of an organic dispersing agent and an alkali, which does not injuriously affect the colloid, until the rubber disperses in the aqueous solution, the solution then being in the continuous phase.

5. A process of dispersing rubber, which comprises incorporating into a mass of rubber an organic hydrophilic colloid and the reaction product of an alkali and a nitrogenous body, and manipulating the mass in the presence of water until the rubber disperses in the water.

6. A process of dispersing rubber, which comprises incorporating sea moss into a mass of rubber and manipulating the mass while gradually adding water thereto until the rubber disperses in the water.

In testimony whereof I have affixed my signature.

WILLIAM BEACH PRATT.